United States Patent
Natanzon et al.

(10) Patent No.: US 10,423,506 B1
(45) Date of Patent: Sep. 24, 2019

(54) FAST REBUILD USING LAYERED RAID

(71) Applicant: EMC Corporation, Hopkinton, MA (US)

(72) Inventors: Assaf Natanzon, Tel Aviv (IL); Erez Webman, Petach Tikva (IL)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 14/755,808

(22) Filed: Jun. 30, 2015

(51) Int. Cl.
*G06F 11/20* (2006.01)

(52) U.S. Cl.
CPC ...... *G06F 11/2056* (2013.01); *G06F 11/2094* (2013.01)

(58) Field of Classification Search
CPC ... G06F 11/20; G06F 11/2056; G06F 11/2094
USPC ......................................... 714/6.23
See application file for complete search history.

(56) References Cited

U.S. PATENT DOCUMENTS

| | | | | |
|---|---|---|---|---|
| 7,836,387 B1* | 11/2010 | Wong | ............... | G06F 21/606 714/819 |
| 2007/0195692 A1* | 8/2007 | Hagglund | ............ | G06F 11/2058 370/216 |
| 2008/0250269 A1* | 10/2008 | Cherian | ............ | G06F 11/1092 714/6.12 |
| 2009/0044043 A1* | 2/2009 | Cherian | ............ | G06F 11/1092 714/6.12 |
| 2009/0198942 A1* | 8/2009 | Morishita | ............ | G06F 3/0605 711/170 |
| 2009/0271659 A1* | 10/2009 | Troppens | ............ | G06F 11/1092 714/6.32 |
| 2010/0251012 A1* | 9/2010 | Zwisler | ............ | G06F 11/1092 714/6.32 |
| 2015/0199129 A1* | 7/2015 | Nair | ............ | G06F 3/064 711/114 |
| 2015/0205668 A1* | 7/2015 | Sundaram | ............ | G06F 3/0689 714/6.24 |
| 2016/0092109 A1* | 3/2016 | Wu | ............ | G06F 3/061 711/114 |
| 2016/0092326 A1* | 3/2016 | Wu | ............ | G06F 11/1076 714/6.3 |
| 2016/0179644 A1* | 6/2016 | Wu | ............ | G06F 3/0619 714/6.22 |
| 2016/0378364 A1* | 12/2016 | Malina | ............ | G06F 3/0619 711/114 |

* cited by examiner

*Primary Examiner* — Kamini B Patel
(74) *Attorney, Agent, or Firm* — Krishnendu Gupta; Deepika Bhayana

(57) ABSTRACT

A System, Computer program product, and computer-executable method of rebuilding a failed data storage device within a storage architecture including a plurality of protection domains including two or more data storage devices, wherein a RAID protection is generated over volumes provided from the plurality of protection domains, the System, Computer program product, and computer-executable method including receiving a notification of a failed data storage device of the data storage devices within a first protection domain of the plurality of protection domains and rebuilding the failed data storage device using reserved data storage within a first data storage device within the first protection domain.

20 Claims, 16 Drawing Sheets

FAST REBUILD USING LAYERED RAID

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A System, Computer program product, and computer-executable method of rebuilding a failed data storage device within a storage architecture including a plurality of protection domains including two or more data storage devices, wherein a RAID protection is generated over volumes provided from the plurality of protection domains, the System, Computer program product, and computer-executable method including receiving a notification of a failed data storage device of the data storage devices within a first protection domain of the plurality of protection domains and rebuilding the failed data storage device using reserved data storage within a first data storage device within the first protection domain.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Typically, data storage architectures rely on one or more implementations of Redundant Arrays of Inexpensive Disks (RAID) to protect a user's data. Traditionally, when a data storage device fails, other data storage devices within the RAID implementation are used to rebuild the failed data storage device. Conventionally, rebuilding a single data storage device from multiple sources within a RAID implementation can be a time intensive process. Generally, the data storage industry would benefit from improved data rebuilding techniques to decrease the downtime of storage architectures.

Forming a Protection Domain in a Storage Architecture

Described herein are techniques to form a protection domain in a storage architecture.

Figure 1A:
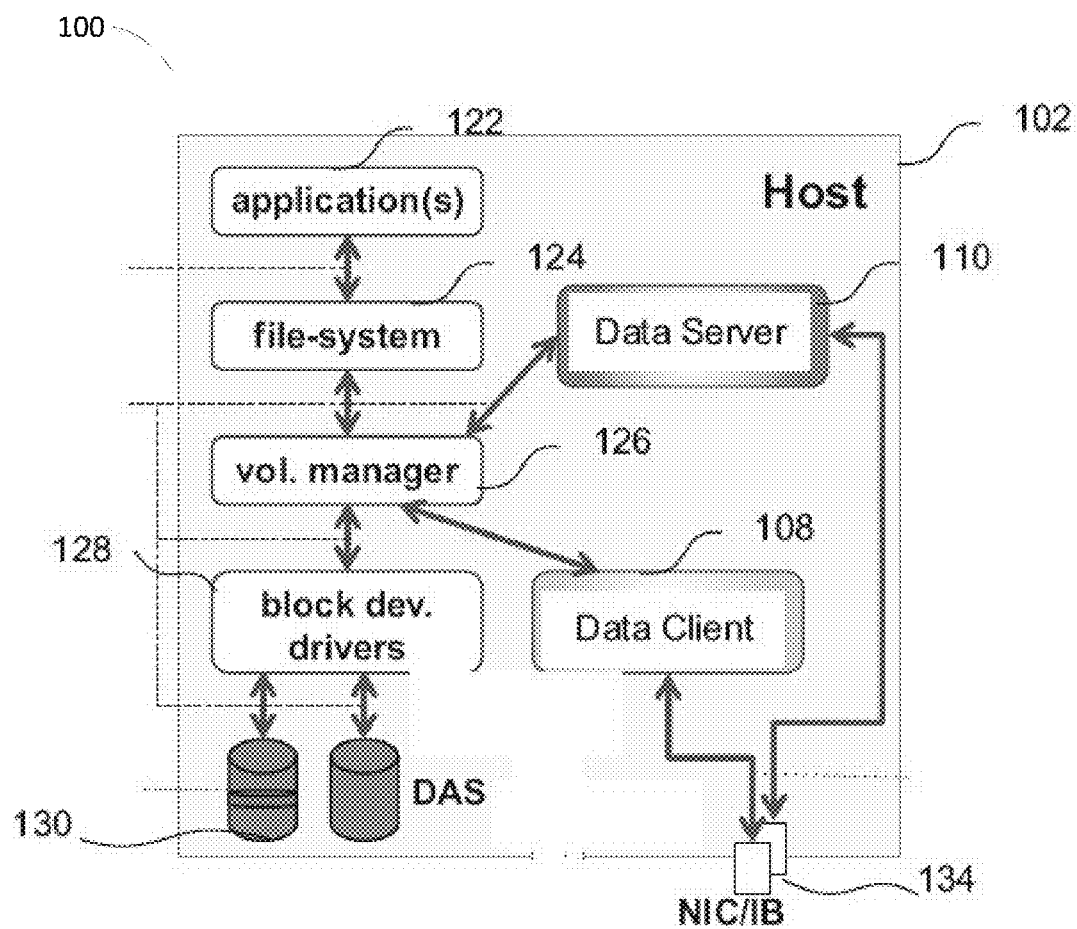
FIG. 1A is a block diagram of an example of a system to manage a distributed storage space.

Referring to FIG. 1, a system 100 to manage a distributed storage space includes a host 102. The host 102 includes a data client 108, a data server 110, application(s) 122, a file system 124, a volume manager 126, block device driver 128 and a network interface card (NIC) 134. Communications between the application(s) 122 and the file system 124 use file-system semantics.

Communications between the file system 124, the volume manager 126, the volume manager 126, the block device drivers 128, the DAS 130 and the HBAs 132 use block semantics. The data client 108 is a block device driver that exposes shared block volumes to the application 122. The data client 108 serves the I/O request of the resident host applications 122. The data server 110 is a daemon/service that owns local storage (e.g., DAS 130) that contributes to the storage pool. The data server 110 serves the I/O requests of various data clients 108.

Figure 1B:
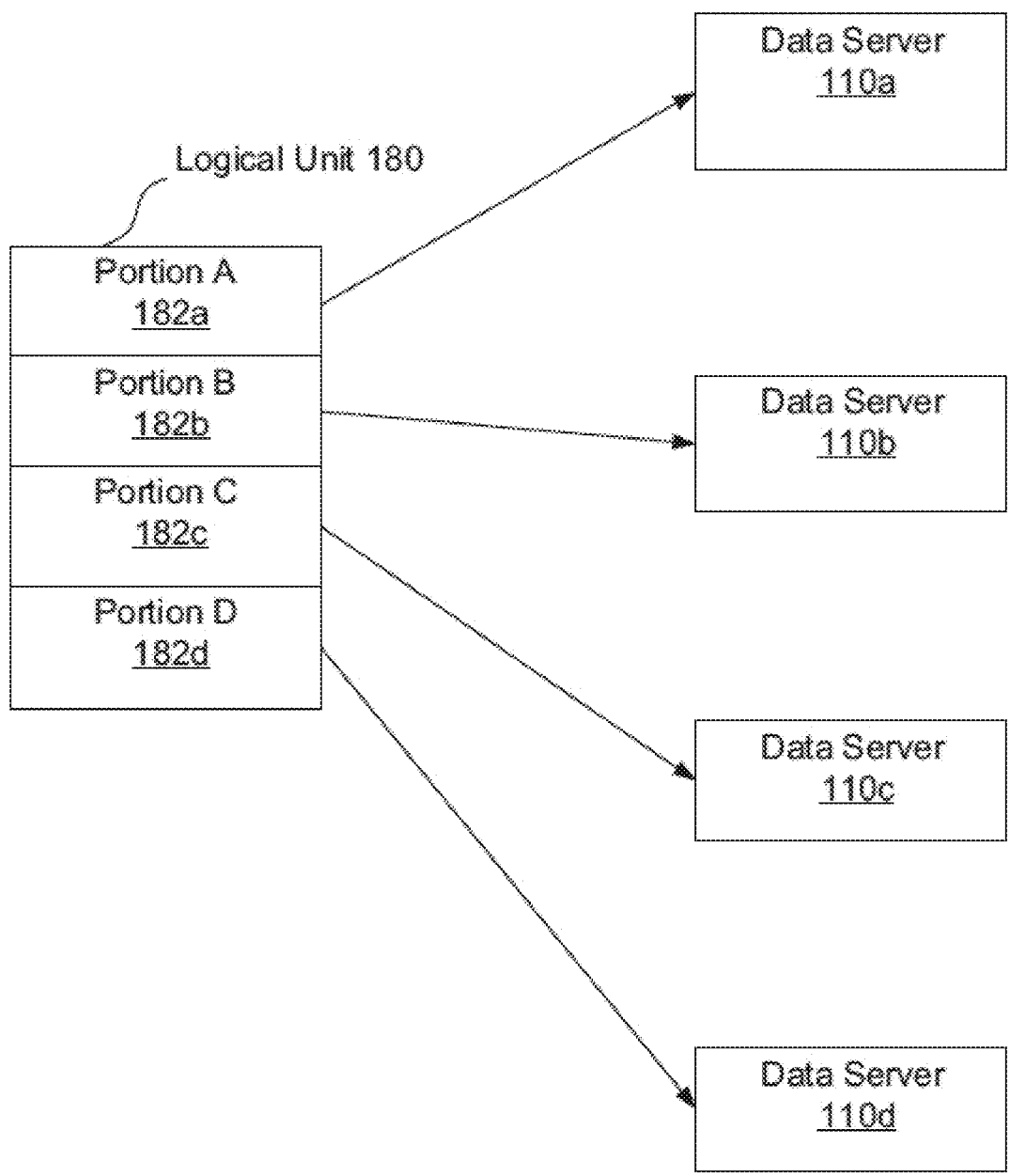
FIG. 1B is a block diagram of a relationship between a logical unit and data servers.

Referring to FIG. 1B, a software-defined storage layer can expose logical units (LUs) or devices, where each device is spread across all the storage devices in all the storage servers in the relevant protection domain. For example, each data server 110a-110d is responsible for handling a portion of a logical unit 180. For example, a portion A 182a of the logical unit 180 is handled by the data server 110a, a portion B 182b of the logical unit 180 is handled by the data server 110b, a portion C 182c of the logical unit 180 is handled by the data server 110c and a portion D 182d of the logical unit 180 is handled by the data server 110d. A portion of the logical unit includes one or more data blocks. In one example, a data block may be 4 kb or 8 kb. In another example, a data block is any size designated by a user. Each data server 110a-110d is responsible for writing data in their respective portion 182a-182d of the logical unit 180 to their respective block storage device.

Figure 1C:
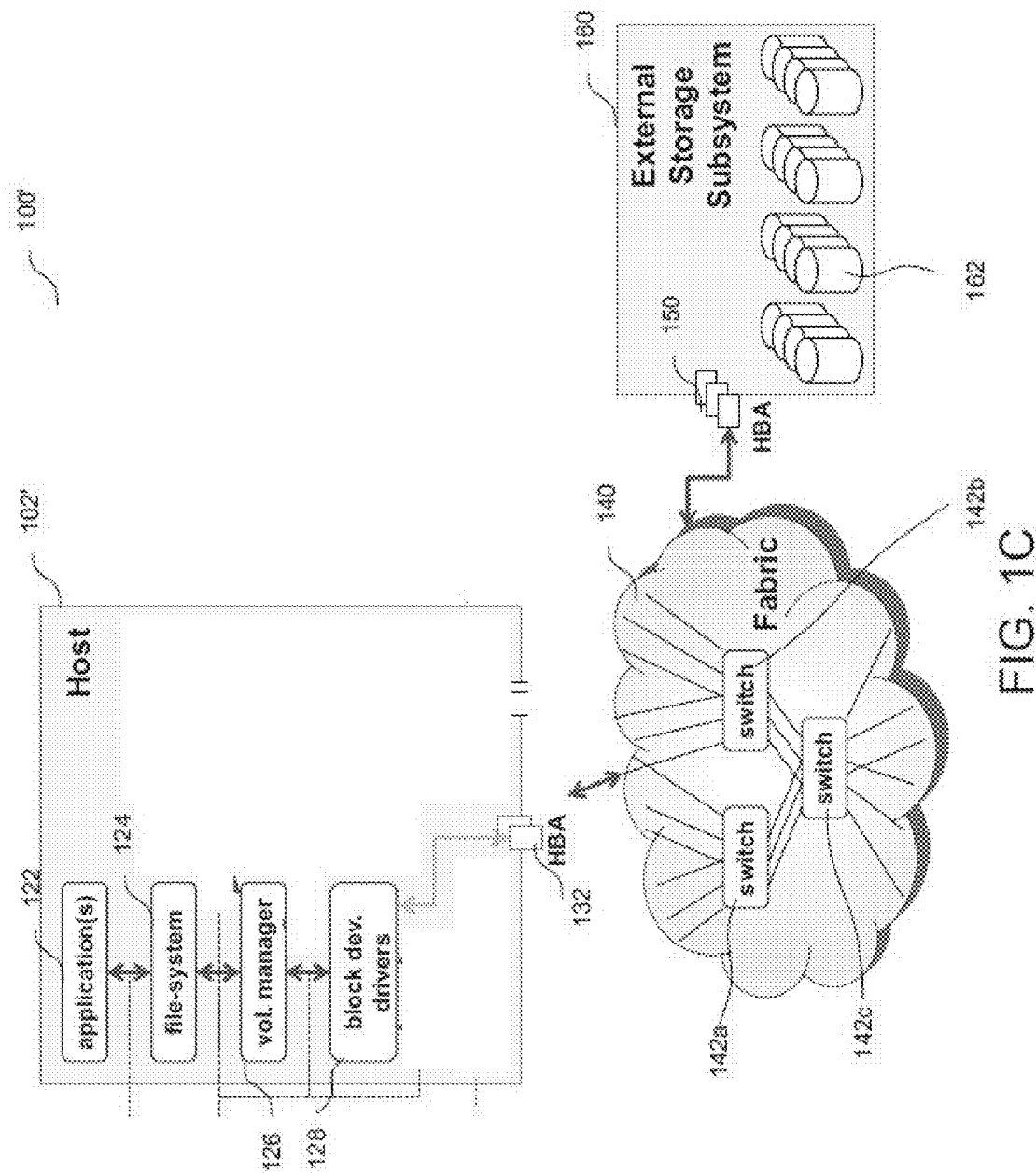
FIG. 1C is a block diagram of a system with a host and storage network.

Referring to FIG. 1C, a system 100' includes a host 102', connected to an external storage subsystem 160 of disks 162 by a fabric 140. The fabric 140 is connected to the external storage subsystem 160 through host bus adapters (HBAs) 150. The fabric 140 includes switches (e.g., switches 142a-142c). The host 102' includes application(s) 122, a file system 124, a volume manager 126, block device driver 128, and host bus adapters (HBAs) 132 to communicate to the fabric 140.

As will be further described herein the systems 100, 100' represent storage architectures that may be used in protection domains.

Figure 2:
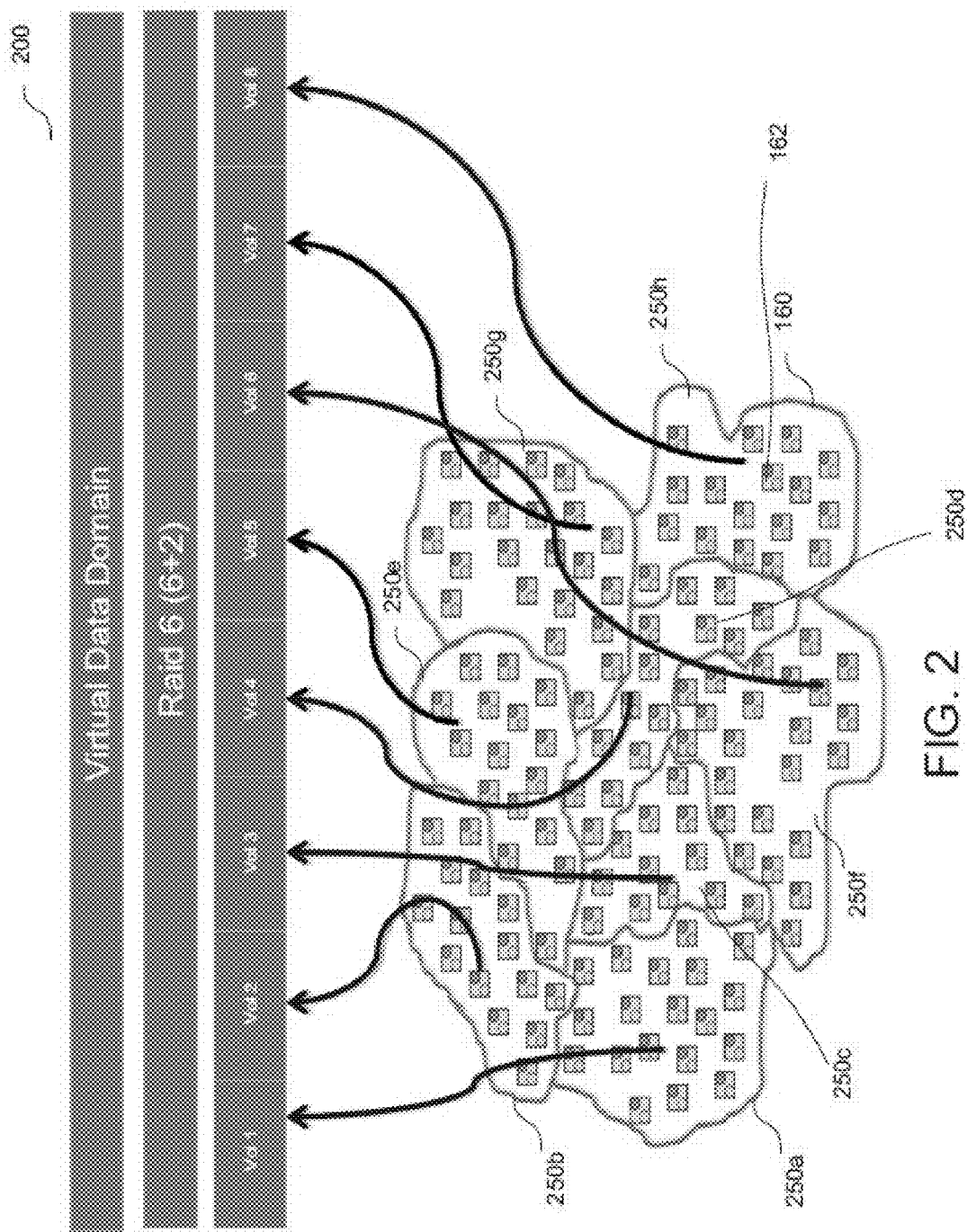
FIG. 2 is a block diagram of an example of a virtual data domain using a distributed storage system.

Referring to FIG. 2, an example of scale out architecture is a scale out architecture 200. The architecture 200 includes a scale out storage system with protection domains (e.g., EMC® SCALEIO®) with a data domain virtual appliance installed over it. A protection domain is a virtual storage array (volumes) formed on a set of storage devices. Each protection domain has its own failure model and failure of one protection domain will not cause failure in another protection domain. In this embodiment the protection domains do not mirror the I/Os, so that a failure of one node or one disk will cause the loss of a complete protection domain (typically in a software defined storage all devices are mirrored so a failure of a single device does not imply loss of access to the storage in this case the devices are not mirrored).

In the example in FIG. 2, there are eight protection domains (250a-250h) formed over storage devices (e.g., a set of the storage devices 160 such the device 162). A volume from each protection domain is configured. For example, the protection domain 250a exposes volume 1, the protection domain 250b exposes a volume 2, the protection domain 250c exposes volume 3, . . . , the protection domain 250h exposes volume 8. A data domain virtual appliance is configured to consume the 8 virtual volumes and treat each volume as a separate disk drive (and also the volumes are striped across multiple devices).

The data domain instance uses RAID 6 over the volumes. In the example in FIG. 2, RAID 6 is formed over eight volumes (6+2). Thus, in such a deployment there is double protection (due to the RAID 6) using less storage, i.e., with no mirroring availability is achieved by the RAID at an upper storage layer.

If a regular deployment of the scale out architecture (e.g., EMC® SCALEIO® version) is used (i.e., each protection domain also has mirroring between its volumes), the system 300 will protect against up to five failures. The configuration in FIG. 2 is deployable in a hyper-converged infrastructure, where the amount of nodes and devices is relatively large.

Multiple data domain instances can be deployed on the same set of protection domains, thus giving multi tenancy and scale out architecture. If a single namespace file system is implemented in the data domain, then this architecture can be used for a single huge scale data domain system.

Figure 3:
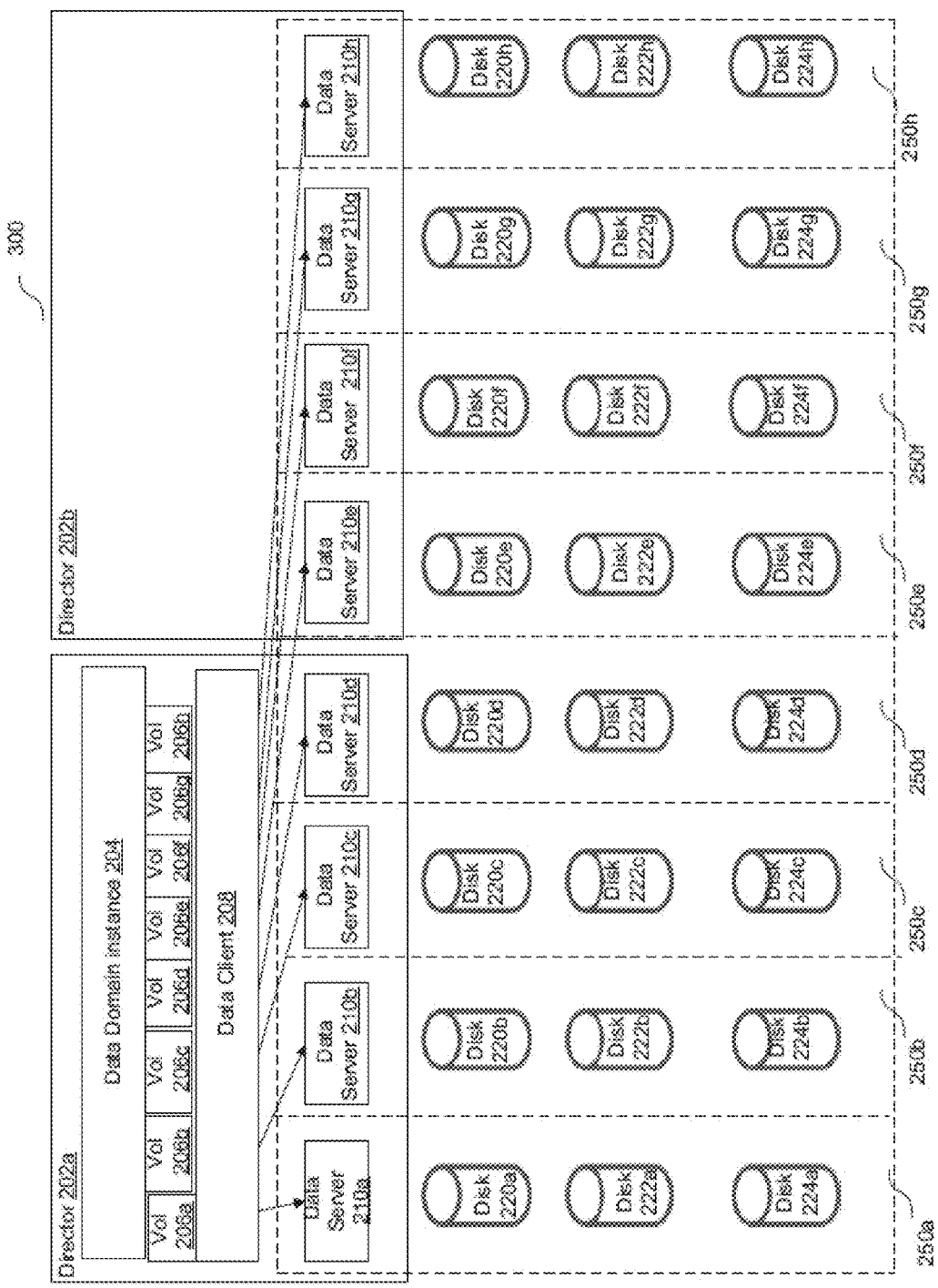
FIG. 3 is a block diagram of an example of first configuration of the virtual data domain.

Referring to FIG. 3, a first configuration 300 of the scale out architecture 200 includes a director 202a, a director 202b and storage disks (e.g., storage disks 220a-220h, 222a-222h, 224a-224h), which are dual ported (i.e., both directors 202a, 202b can access the storage devices). The director 202a includes a data domain instance 204 (e.g., using Raid 6+2) over volumes 206a-206h, a data client 208 and data servers 210a-210d. The director 202b includes data servers 210e-210h. In this configuration, a protection domain 250a is formed for the volume 206a and includes data server 210a and devices 220a, 222a, 224a; a protection domain 250b is formed for the volume 206b and includes data server 210b and devices 220b, 222b, 224b; . . . , and a protection domain 250h is formed for the volume 206h and includes data server 210h and devices 220h, 222h, 224h.

Figure 4:
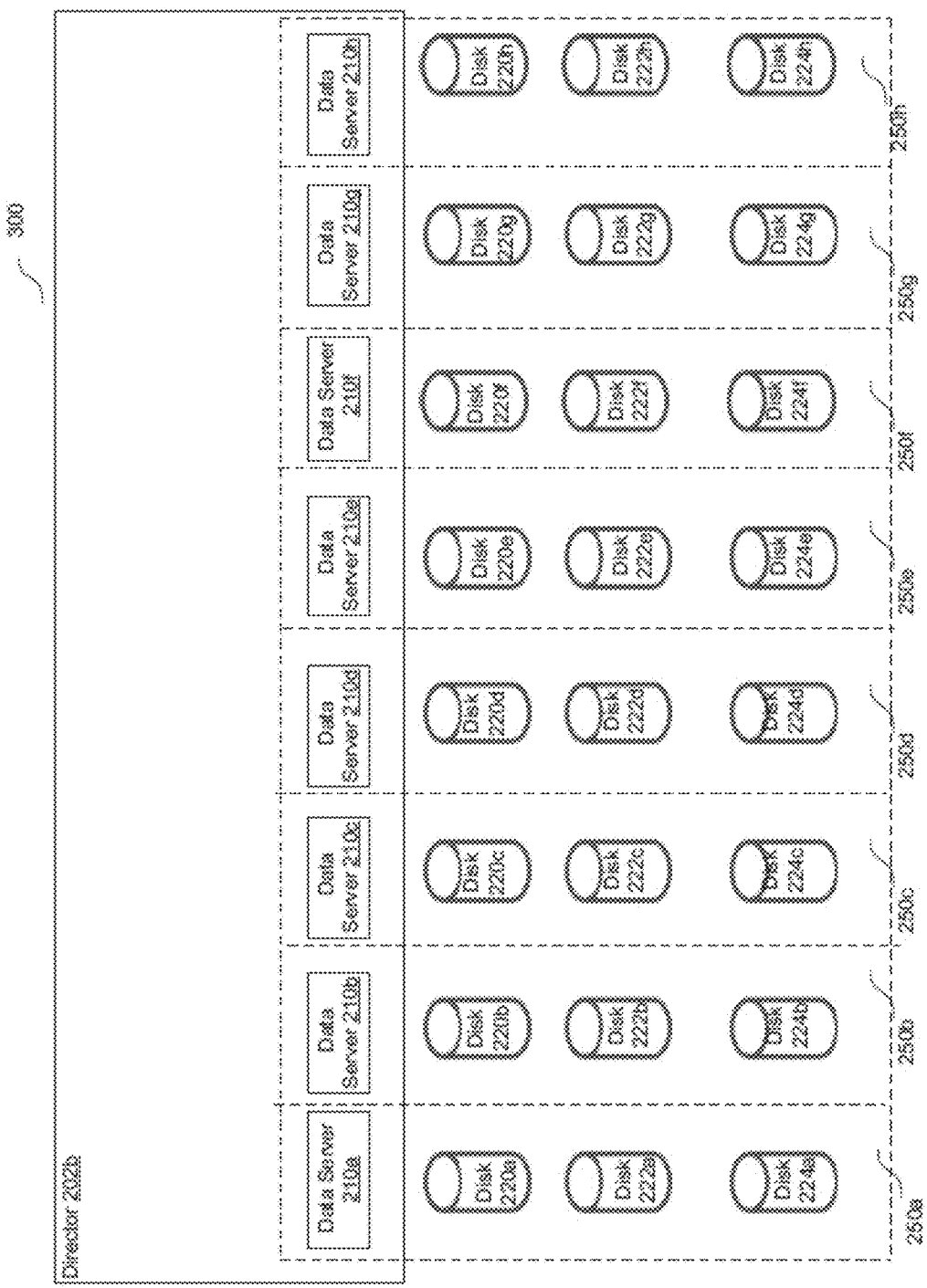
FIG. 4 is a block diagram of an example of the first configuration of the virtual data domain after failure of a director.

Referring to FIG. 4, in the configuration 300, if one of the directors fails the data servers will immediately start running on the second director, since the disks are dual ported the access to the disks is not lost. For example, as shown on FIG. 4, the director 202a has failed and the data servers 210a-210e start running on the director 202b and thus the virtual data domain can continue to run on the second director.

Figure 5:
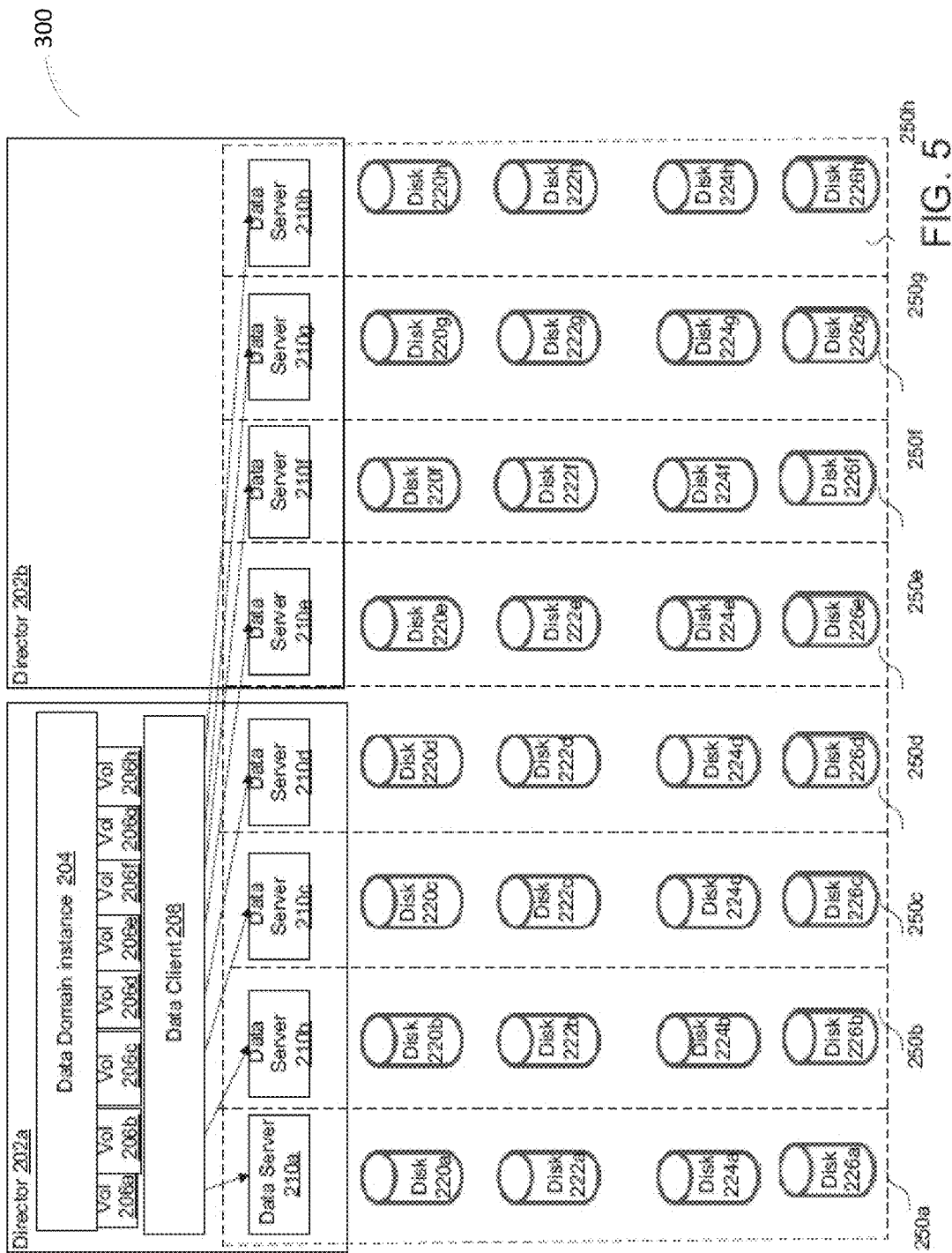
FIG. 5 is a block diagram of an example of the first configuration of the virtual data domain with additional disks added.

Referring to FIG. 5, in the configuration 300, adding more devices may be done by adding a disk in each protection domain and data is automatically re-spread over all the devices. The re-spreading of the data is done by the scale out architecture (e.g., EMC® SCALEIO®) software-defined storage and there is no awareness of the process at the layer of the data domain. For example, each of disks 226a-226h are added to a respective domain 250a-250a. For example, disk 226a is added to the protection domain 250a, disk 226b is added to the protection domain 250b, . . . , and disk 226h is added to the protection domain 250h.

Figure 6:
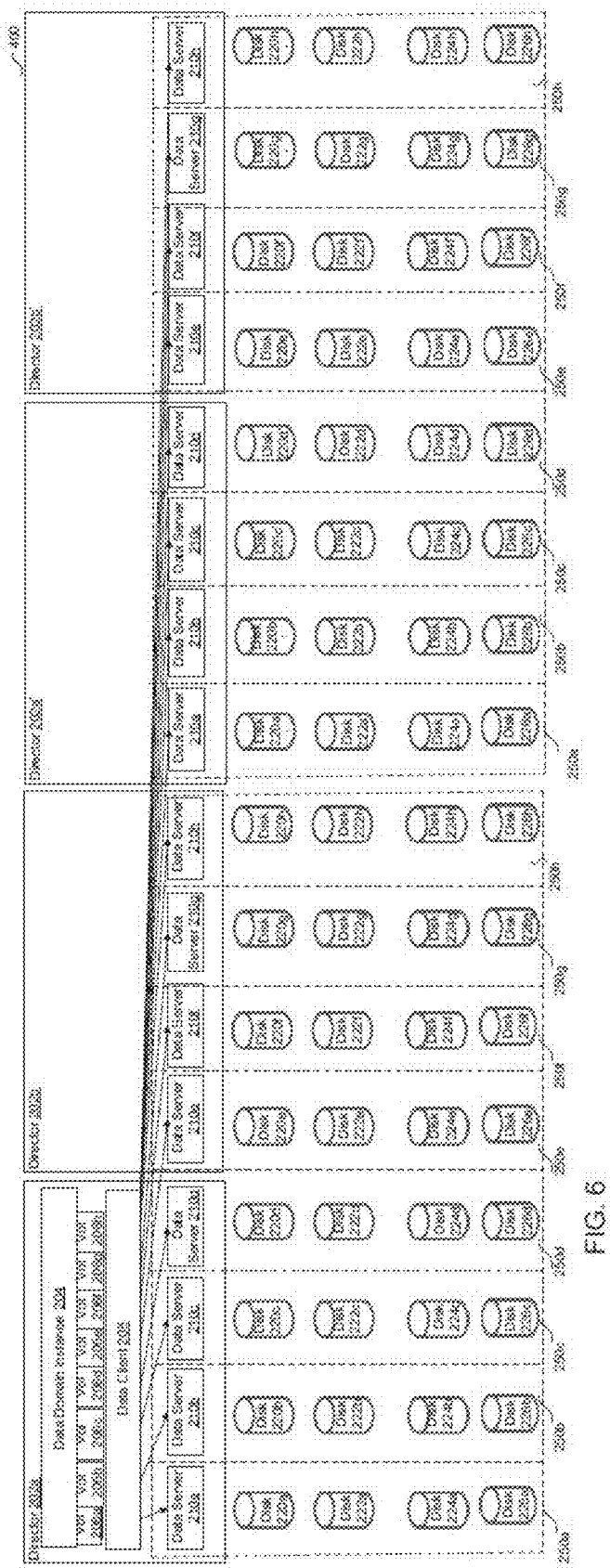
FIG. 6 is a block diagram of an example of a second configuration of the virtual data domain.

Referring to FIG. 6, the architecture 300 can also be scaled out by adding more directors. For example, in an architecture 400, directors 202a', 202b' are added. The director 202a' is similar as director 202a and the director 202b' is the similar as director 202b. That is, director 202a' includes data server 210a-210d for protection domains 250a-250d but over new devices 222a'-222d', 224a'-224d', 226a'-226d' and director 202b' includes data server 210e-210h for protection domains 250e-250h but over new devices 222e'-222h', 224e'-224h', 226e'-226h'. That is, the data is automatically spread by the software-defined storage layer across the new devices added to each protection domain. The data domain layer is not aware of this process. Multiple instances of data domain can run, for example. An instance or more of a data domain can run on each director.

Each instance may use different LUs or volumes exposed by the same eight protection domains 250a-250h.

Figure 7:
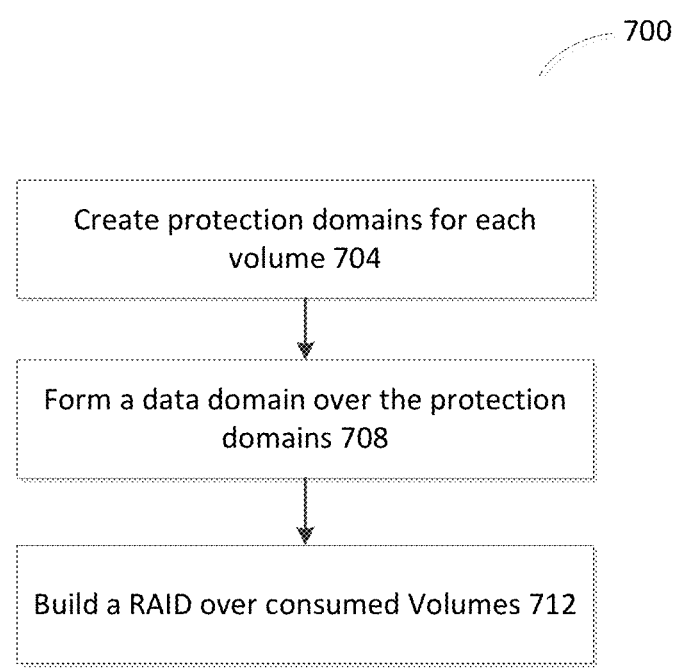
FIG. 7 is a flowchart of an example of a process to form a scale out architecture.

Referring to FIG. 7, a process 700 is an example of a process to form a scale out architecture, for example, as shown in FIGS. 2 to 6. Process 700 creates protection domains for each volume (704) and then form a data domain over the protection domains by consuming volumes from the protection domains (708). Process 700 then builds RAID over the consumed volumes (712). Each protection domain includes a data server and a plurality of disks and there is an equal number of disks in each data protection domain.

Figure 8:
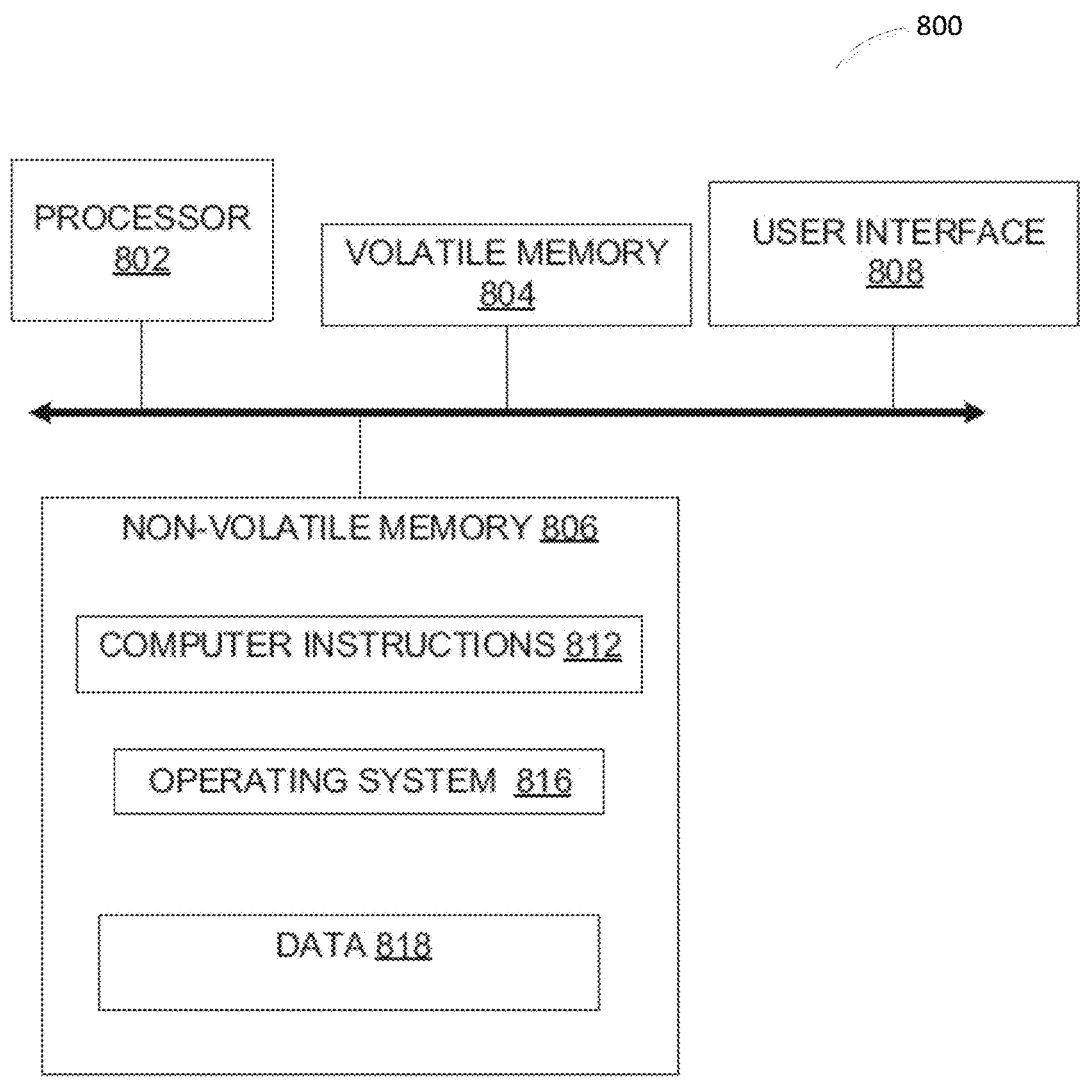
FIG. 8 is a computer on which any of the processes of FIG. 7 may be implemented.

Referring to FIG. 8, in one example, a computer 800 includes a processor 802, a volatile memory 804, a non-volatile memory 806 (e.g., hard disk) and the user interface (UI) 808 (e.g., a graphical user interface, a mouse, a keyboard, a display, touch screen and so forth). The non-volatile memory 806 stores computer instructions 812, an operating system 816 and data 818. In one example, the computer instructions 812 are executed by the processor 802 out of volatile memory 804 to perform all or part of the processes described herein (e.g., process 700).

The processes described herein (e.g., process 700) are not limited to use with the hardware and software of FIG. 8; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 700 is not limited to the specific processing order of FIG. 7. Rather, any of the processing blocks of FIG. 7 may be re-ordered, combined or removed, performed in parallel or in serial, as necessary, to achieve the results set forth above.

The processing blocks (for example, in the process 700) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

Fast Rebuild Using a Layered Raid

In many embodiments, the current disclosure may enable creation of a storage architecture that includes a scale out storage system with protection domains (i.e., EMC® SCA-LEIO®) with data domain virtual appliance installed over the protection domains. In various embodiments, the current disclosure may enable a storage architecture to efficiently and/or quickly rebuild one or more failed/corrupted data storage devices within a protection domain. In certain embodiments, the current disclosure may enable a storage architecture to quickly make available data stored on a data storage device that has failed and/or been corrupted.

In most embodiments, a storage architecture may include one or more protection domains. In various embodiments, a protection domain may include one or more data storage devices. In these embodiments, a protection domain may implement a modified version of RAID 0 on the data storage devices. In certain embodiments, a storage architecture may include a data domain virtual appliance installed over each of the protection domains. In other embodiments, each of the one or more protection domains may provide a Logical Unit (LUN) and/or volume to be managed by the data domain virtual appliance. In some embodiments, a data domain appliance may be non-virtual.

In many embodiments, a data domain virtual appliance may implement a RAID using volumes provided by each of the protection domains. In various embodiments, a data domain virtual appliance may implement RAID 6 using eight volumes provided by eight separate protection domains. In most embodiments, each data storage device within each protection domain may reserve a portion of data storage to be free. In various embodiments, the amount of data storage reserved may be proportional to the number of data storage devices within the protection domain. In some embodiments, the amount of data storage reserved may be enough to recover from a single disk failure. In other embodiments, the amount of free space reserved may be the size of a spindle or multiple spindles to allow for multiple failures. In certain embodiments, if a data storage device within a protection domain fails, other data storage devices within the protection domain may utilize reserved space for rebuilding the failed data storage device. In these embodiments, the data domain virtual appliance may rebuild the protection domain with the failed data storage device from one or more volumes of one or more protection domains comprising the RAID 6 implementation. In some embodiments, once data from the failed data storage devices may be accessible from the protection domain with the failed data storage device, the protection domain may start rebuilding the failed data storage device in the background. In most embodiments, rebuilding lost data to multiple data storage devices may increase the speed at which the lost data may be restored.

In many embodiments, a protection domain may be managed by a data storage system, such as Scale IO, which may implement a form of de-clustered RAID 0. In various embodiments, a de-clustered Raid 0 implementation may keep a single copy of data striped across two more data storage devices within a protection domain. In certain embodiments, each protection domain may have n number of devices and the data may be spread across each of those devices. In most embodiments, each of the data storage devices may reserve 1/(n−1) of the data storage on each device data storage device to enable failure protection. In various embodiments, if a data storage device within a protection domain fails, there may be enough data storage space within the protection domain to rebuild the lost data. In many embodiments, to allow for failures of more than a single device, each of the data storage devices may reserve k/(n−k), for k devices, of the data storage space free on each device to allow for failures of more than a single device.

In certain embodiments, from each protection domain, a storage architecture may be enabled to create and/or access a Logical Unit (LUN and/or Volume). In some embodiments, a storage architecture may combine multiple LUNs from multiple protection domains to provide data storage using a RAID implementation, such as a Raid 6 (6+2) implementation. In most embodiments, in event of a data storage device failure within a protection domain, most of the data may still be available within the protection domain. In various embodiments, if a data storage device fails, there may be reserved data storage space available within the protection domain spread among every other data storage device which may be enabled to hold the data of the failed data storage device. In certain embodiments, the system may reallocate the lost portions of the LUN to the reserved data storage on the remaining data storage devices and may notify the above RAID layer as to which segments of the LUN may be lost and may require a rebuild. In some embodiments, the RAID 6 portion of the storage architecture may rebuild only lost areas of the protection domain, onto the reserved portions of data storage devices within the protection domain where the data storage device failed. In most embodiments, as the target rebuilt is distributed among the data storage devices of the protection domain of the failed data storage device, the storage architecture may be executing a many to many rebuild of the lost data, which may provide faster RAID rebuild performance.

Figure 9:
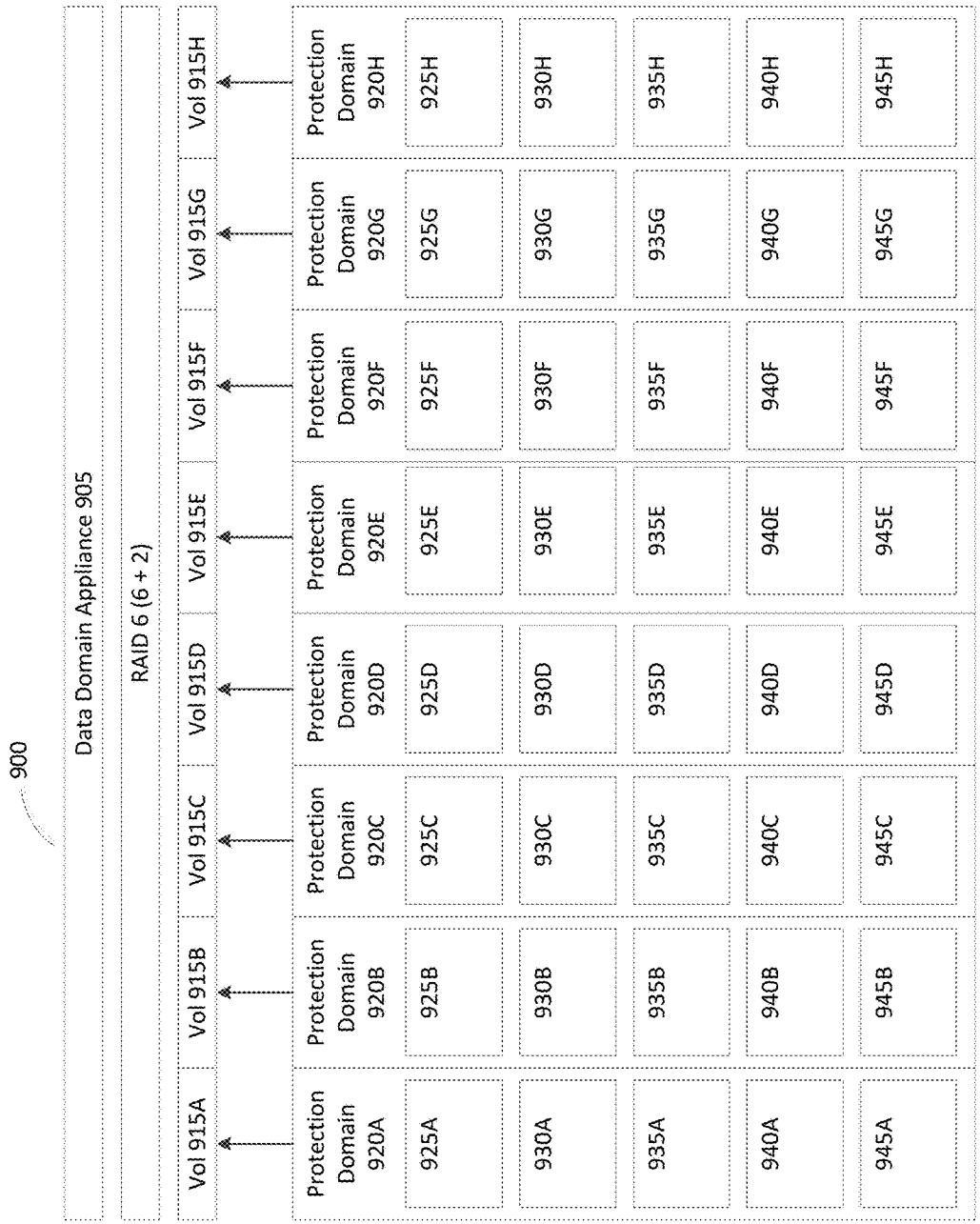
FIG. 9 is a simplified illustration of a storage architecture utilizing multiple RAID layers, in accordance with an embodiment of the present disclosure.

Refer to the example embodiment of FIG. 9. FIG. 9 is a simplified illustration of a storage architecture utilizing multiple RAID layers, in accordance with an embodiment of the present disclosure. Storage architecture 900 includes a scale out storage system with protection domains (920A-H, 920 Generally) with data domain appliance 905 installed over it. In this embodiment, each Protection Domain 920 includes data storage devices implementing de-clustered RAID 0. As shown, each data storage device within each Protection Domain 920 reserves a portion of data storage to facilitate data storage device rebuild operations. Protection Domain 920A includes data storage devices 925A, 930A, 935A, 940A, and 940A. Protection Domain 920B includes data storage devices 925B, 930B, 935B, 940B, and 940B. Protection Domain 920C includes data storage devices 925C, 930C, 935C, 940C, and 940C. Protection Domain 920D includes data storage devices 925D, 930D, 935D, 940D, and 940D. Protection Domain 920E includes data storage devices 925E, 930E, 935E, 940E, and 940E. Protection Domain 920F includes data storage devices 925F, 930F, 935F, 940F, and 940F. Protection Domain 920G includes data storage devices 925G, 930G, 935G, 940G, and 940G. Protection Domain 920H includes data storage devices 925H, 930H, 935H, 940H, and 940H.

In this embodiment, Protection Domain 920A provides data storage volume 915A to Data Domain Appliance 905. Protection Domain 920B provides data storage volume 915B to Data Domain Appliance 905. Protection Domain 920C provides Data storage volume 915C to Data Domain Appliance 905. Protection Domain 920D provides Data storage volume 915D to Data Domain Appliance 905. Protection Domain 920E provides Data storage volume 915E to Data Domain Appliance 905. Protection Domain 920F provides data storage volume 915F to Data Domain Appliance 905. Protection Domain 920G provides data storage volume 915G to data domain appliance 905 and Protection domain 920H provides data storage volume 915H to Data Domain Appliance 905.

Data Domain Appliance 905 is enabled to implement RAID 6 across volumes (915A-H, 915 Generally). In many embodiments, a data domain appliance may be enabled to implement alternate forms of RAID to provide redundant data protection. In various embodiments, each protection domain may include two or more data storage devices. In certain embodiments, a protection domain may be enabled to provide multiple data storage volumes to multiple data domain appliances to provide data storage redundancy. In some embodiments, a protection domain may be enabled include more data storage devices on demand, where each protection domain may be enabled to seamlessly redistribute stored data across each data storage device, including added data storage devices. In most embodiments, each data storage device may reserve a portion of data storage space to facilitate rebuilding of a failed data storage device within a protection domain. For example, in one embodiment, a protection domain with five data storage devices may reserve twenty-five percent of available storage space on each data storage device to facilitate data rebuild. In the example embodiment, if a data storage device failed, the data domain appliance may be enabled to rebuild the failed disk on the reserved storage space with the protection domain of the failed data storage device. A Data domain appliance may be enabled to retrieve rebuild information from other data storage volumes used in its implementation of RAID to rebuild the failed disk within a protection domain.

Figure 10:
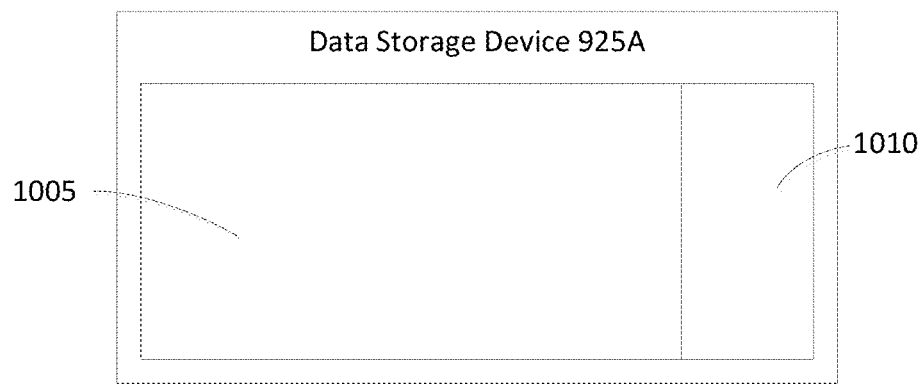
FIG. 10 is a simplified illustration of a data storage device from FIG. 9, in accordance with an embodiment of the present disclosure.

Refer to the example embodiment of FIG. 10. FIG. 10 is a simplified illustration of a data storage device from FIG. 9, in accordance with an embodiment of the present disclosure. As shown, data storage device 925A includes portion 1005 and portion 1010. Portion 1005 and 1010 indicate a total amount of data storage allocated from data storage device 925A for data storage volume 915A (FIG. 9). In this embodiment, each data storage device within protection domains 920 (FIG. 9) is allocated similarly. Portion 1005 is allocated for use by data storage volume 915A (FIG. 9) and portion 1010 is reserved for use while rebuilding a failed drive with protection domain 920A. As shown, portion 1010 is enabled to be proportional in size to the number of data storage devices within each protection domain. For example, in an embodiment, if a protection domain includes ten data storage devices, each data storage device within the protection domain may reserve an amount of data storage such that each data storage device (minus a failed device), in combination, may be enabled to provide data storage in place of the failed device.

Figure 11:
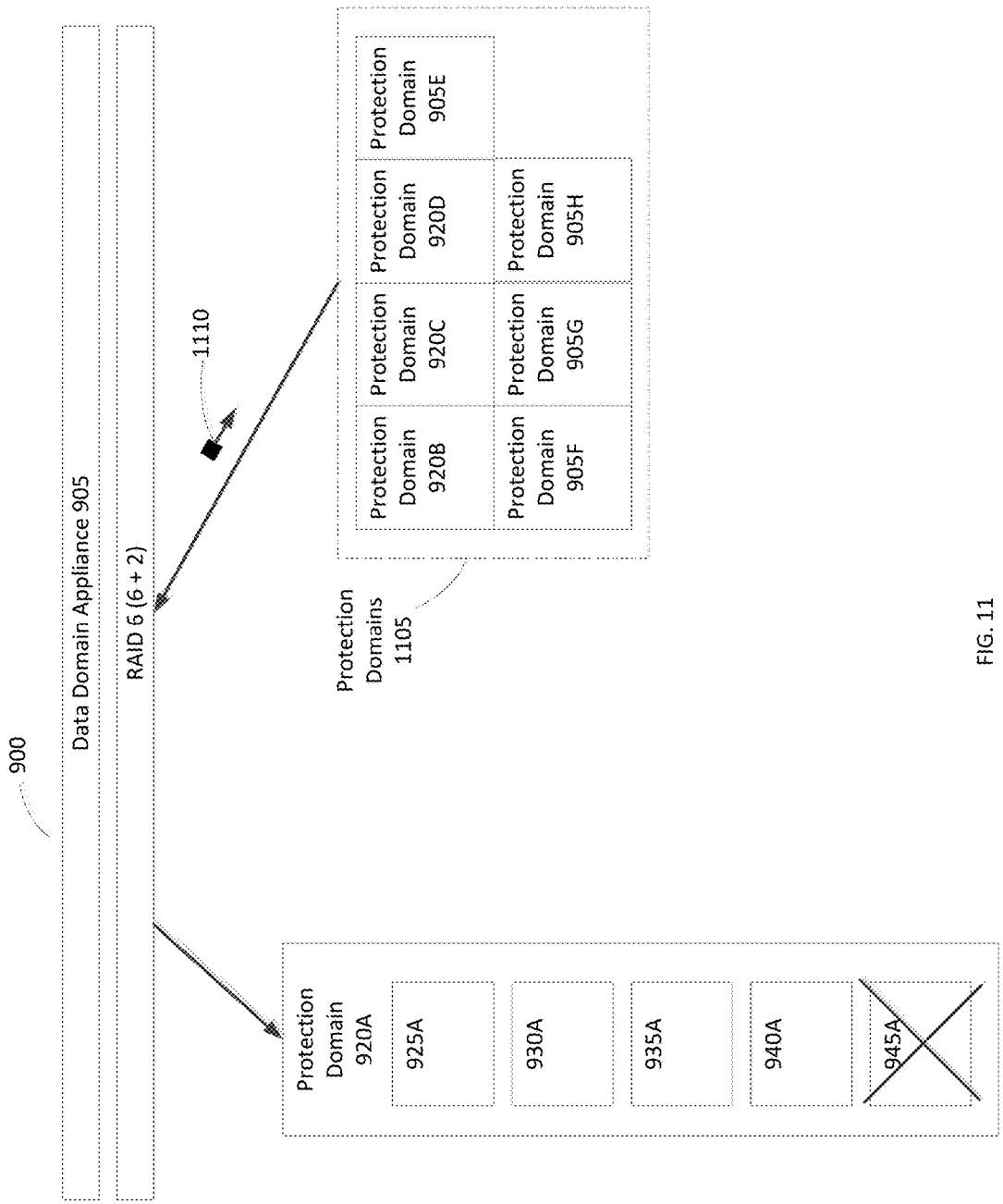
FIG. 11 is a simplified illustration of an alternate state of the storage architecture shown FIG. 9, in accordance with an embodiment of the present disclosure.

Refer to the example embodiment of FIG. 11. FIG. 11 is a simplified illustration of an alternate state of the storage architecture shown FIG. 9, in accordance with an embodiment of the present disclosure. Storage architecture 900 includes a scale out storage system with protection domains (920A-H, 920 Generally) with data domain appliance 905 installed over it. In this embodiment, data storage device 945A has failed. Protection domain 920a discovers the failures and remaps the missing portions of data storage device 945A and notifies the RAID 6 layer as to which slices of the volume from protection domain 920A are corrupted. The RAID 6 layer communicates with protection Domains 1105 using message 1110 to retrieve rebuild information to facilitate rebuilding the data previously stored on failed data storage device 945A. Rebuild information included in message 1115 is sent from one or more protection domains within Protection Domains 1105 to protection domain 920A. Protection domain 920A utilizes reserve portions of data storage devices 925A, 930A, 935A, and 940A to quickly rebuild data lost from data storage device 945A and make the data gain available. In this embodiment, the remapping of the data from data storage device 945A to data storage devices 925A, 930A, 935A, and 940A happens seamlessly without any of users of the data perceiving a change.

In many embodiments, a protection domain that rebuilds a failed drive using reserved data storage may be enabled to rebuild the failed drive using background processes. In certain embodiments, once a failed drive has been rebuilt, reserved portions of other data storage devices may be reallocated to be reserved data storage once again while the formerly failed drive may be brought back online.

Figure 12:
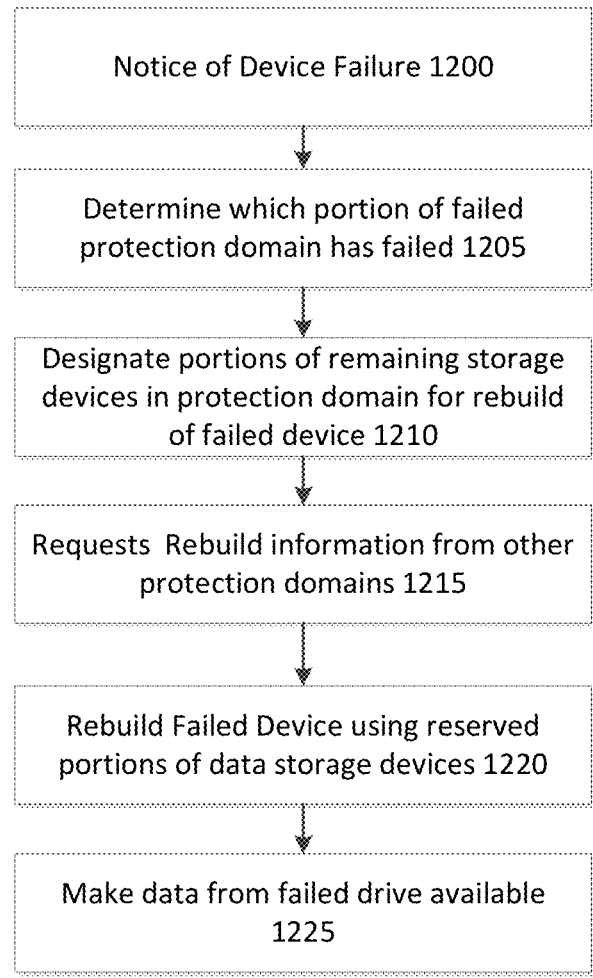
FIG. 12 is a simplified flowchart of a method of rebuilding a data storage device in a layered RAID storage architecture as shown in FIG. 11, in accordance with an embodiment of the present disclosure.

Refer to the example embodiment of FIGS. 11 and 12. FIG. 12 is a simplified flowchart of a method of rebuilding a data storage device in a layered RAID storage architecture as shown in FIG. 11, in accordance with an embodiment of the present disclosure. Storage architecture 900 includes a scale out storage system with protection domains (920A-H, 920 Generally) with data domain appliance 905 installed over it. Data domain appliance 905 receives a device failure notice (Step 1200) from Protection Domain 920A. Protection Domain 920A determines which portion of protection domain 920A has failed and notifies the RAID 6 layer (Step 1205). Protection Domain 920A designates reserved portions of data storage devices 925A, 930A, 935A, and 940A for rebuild of failed data storage device 945A (Step 1210). The Raid 6 layer requests rebuild information of the volumes exposed by the protection domains 1105 (Step 1215) using message 1110. Data Domain Appliance 905 writes the rebuilt information to Protection Domain 920A by writing to the device exposed by the protection domain. Protection Domain 920A rebuilds data from failed data storage device 945 by using reserved portions of data storage devices 925A, 930A, 935A, and 940A (Step 1220) and makes the rebuilt data from failed data storage device 945A available (Step 1225).

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 13:
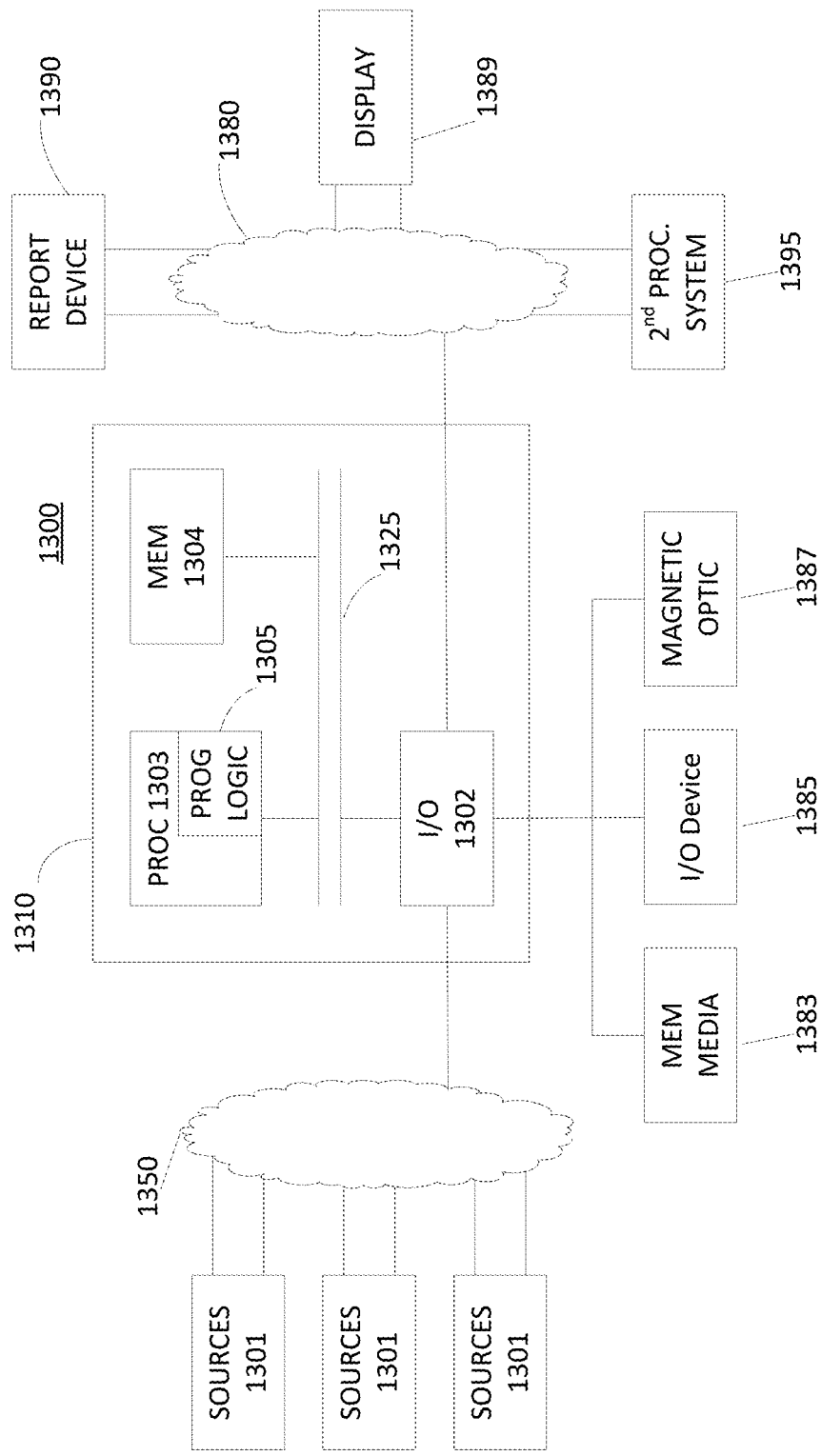
FIG. 13 is an example of an embodiment of an apparatus that may utilize the techniques described herein, in accordance with an embodiment of the present disclosure.

FIG. 13 is a block diagram illustrating an apparatus, such as a computer 1310 in a network 1300, which may utilize the techniques described herein according to an example embodiment of the present invention. The computer 1310 may include one or more I/O ports 1302, a processor 1303, and memory 1304, all of which may be connected by an interconnect 1325, such as a bus. Processor 1303 may include program logic 1305. The I/O port 1302 may provide connectivity to memory media 1383, I/O devices 1385, and drives 1387, such as magnetic drives, optical drives, or Solid State Drives (SSD). When the program code is loaded into memory 1304 and executed by the computer 1310, the machine becomes an apparatus for practicing the invention. When implemented on one or more general-purpose processors 1303, the program code combines with such a processor to provide a unique apparatus that operates analogously to specific logic circuits. As such, a general purpose digital machine can be transformed into a special purpose digital machine.

Figure 14:
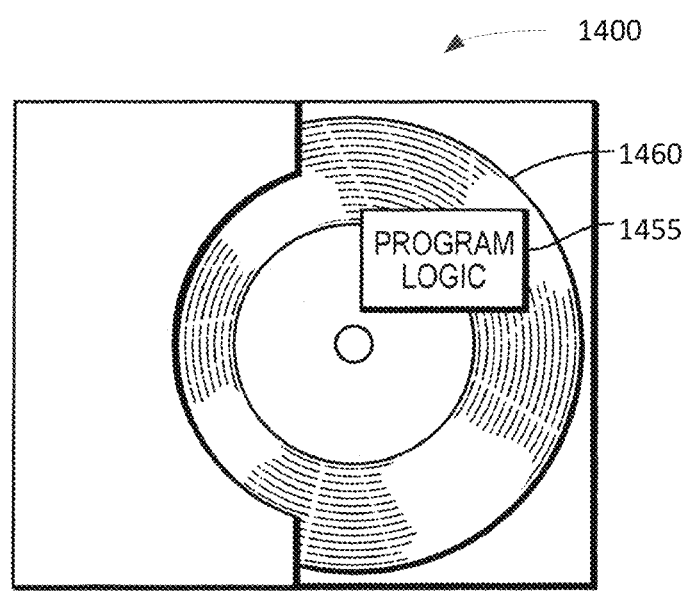
FIG. 14 is an example of a method embodied on a computer readable storage medium that may utilize the techniques described herein, in accordance with an embodiment of the present disclosure.

FIG. 14 is a block diagram illustrating a method embodied on a computer readable storage medium 1460 that may utilize the techniques described herein according to an example embodiment of the present invention. FIG. 14 shows Program Logic 1455 embodied on a computer-readable medium 1460 as shown, and wherein the Logic is encoded in computer-executable code configured for carrying out the methods of this invention and thereby forming a Computer Program Product 1400. Program Logic 1455 may be the same logic 1305 on memory 1304 loaded on processor 1303 in FIG. 13. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-14. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of rebuilding a failed data storage device within a storage architecture including a plurality of protection domains including two or more data storage devices, wherein a RAID protection is generated over volumes provided from the plurality of protection domains, the computer-executable method comprising:

reserving a portion of data storage of each data storage device within the storage architecture wherein each data storage device is associated with a protection domain of the plurality of protection domains, wherein the size of the reserved data storage portion of each data storage device is related to the number of data storage devices within the associated protection domain;

receiving a notification of a failed data storage device of the data storage devices within a first protection domain of the plurality of protection domains;

requesting rebuild information from at least one protection domain;

rebuilding the failed data storage device using the reserved portion of data storage within a first data storage device within the first protection domain;

wherein failure protection is enabled by allocating reserved data storage across multiple storage devices within the first protection domain, and wherein portions of the failed data storage device is enabled to rebuilt onto the reserved data storage within the multiple data storage devices.

2. The computer-executable method of claim 1, wherein each of the two or more data storage devices within the first protection domain reserves a portion of data storage for rebuilding the failed data storage device.

3. The computer-executable method of claim 1, further comprising making data from the failed data storage device available, wherein the data is made available from the data storage devices excluding the failed data storage device.

4. The computer-executable method of claim 1, the first protection domain implements de-clustered RAID 0 across each data storage device of the two or more data storage devices.

5. The computer-executable method of claim 1, wherein the RAID protection is RAID 6.

6. The computer-executable method of claim 1, further comprising:
providing a notification, from the protection layer, to the RAID protection; wherein the notification is enabled to detail which portions of the first protection domain are physically corrupted.

7. The computer-executable method of claim 1, wherein the reserved data storage is free data storage on data storage devices within the first protection domain; and
remapping, on the first protection domain, a location from the failed data storage device to the free data storage on the data storage devices.

8. The computer-executable method of claim 1, wherein the reserved data storage is free data storage on data storage devices within the first protection domain; and
wherein the code is further configured to enable the execution of:
remapping, on the first protection domain, a location from the failed data storage device to the free data storage on the data storage devices.

9. A system, comprising:
a data storage system using a storage architecture including a plurality of protection domains including two or more data storage devices, wherein a RAID protection is generated over volumes provided from the plurality of protection domains; and
computer-executable program logic encoded in memory of one or more computers enabled to rebuild a failed data storage device within the storage architecture, wherein the computer-executable program logic is configured for the execution of:
reserving a portion of data storage of each data storage device within the storage architecture wherein each data storage device is associated with a protection domain of the plurality of protection domains, wherein the size of the reserved data storage portion of each data storage device is related to the number of data storage devices within the associated protection domain;

receiving a notification of a failed data storage device of the data storage devices within a first protection domain of the plurality of protection domains;

requesting rebuild information from at least one protection domain;

rebuilding the failed data storage device using the reserved portion of data storage within a first data storage device within the first protection domain;

wherein failure protection is enabled by allocating reserved data storage across multiple storage devices within the first protection domain, and wherein portions of the failed data storage device is enabled to rebuilt onto the reserved data storage within the multiple data storage devices.

10. The system of claim 9, wherein each of the two or more data storage devices within the first protection domain reserves a portion of data storage for rebuilding the failed data storage device.

11. The system of claim 9, wherein the computer-executable program logic is further configured for the execution of making data from the failed data storage device available, wherein the data is made available from the data storage devices excluding the failed data storage device.

12. The system of claim 9, wherein the first protection domain implements de-clustered RAID 0 across each data storage device of the two or more data storage devices.

13. The system of claim 9, wherein the RAID protection is RAID 6.

14. The system of claim 9, wherein the computer-executable program logic is further configured for the execution of:
providing a notification, from the protection layer, to the RAID protection; wherein the notification is enabled to detail which portions of the first protection domain are physically corrupted.

15. The system of claim 9, wherein the reserved data storage is free data storage on data storage devices within the first protection domain; and
wherein the computer-executable program logic is further configured for the execution of:
remapping, on the first protection domain, a location from the failed data storage device to the free data storage on the data storage devices.

16. A computer program product for rebuilding a failed data storage device within a storage architecture including a plurality of protection domains including two or more data storage devices, wherein a RAID protection is generated over volumes provided from the plurality of protection domains, the computer program product comprising:
a non-transitory computer readable medium encoded with computer-executable code, the code configured to enable the execution of:
reserving a portion of data storage of each data storage device within the storage architecture, wherein each data storage device is associated with a protection domain of the plurality of protection domains, wherein the size of the reserved data storage portion of each data storage device is related to the number of data storage devices within the associated protection domain;

receiving a notification of a failed data storage device of the data storage devices within a first protection domain of the plurality of protection domains;

requesting rebuild information from at least one protection domain;

rebuilding the failed data storage device using the reserved portion of data storage within a first data storage device within the first protection domain;

wherein failure protection is enabled by allocating reserved data storage across multiple storage devices within the first protection domain, and wherein portions of the failed data storage device is enabled to rebuilt onto the reserved data storage within the multiple data storage devices.

17. The computer program product of claim 16, wherein each of the two or more data storage devices within the first protection domain reserves a portion of data storage for rebuilding the failed data storage device.

18. The computer program product of claim 16, wherein the code is further configured to enable the execution of making data from the failed data storage device available, wherein the data is made available from the data storage devices excluding the failed data storage device.

19. The computer program product of claim 16, wherein the first protection domain implements de-clustered RAID 0 across each data storage device of the two or more data storage devices; and wherein the RAID protection is RAID 6.

20. The computer program product of claim 16, wherein the code is further configured to enable the execution of:

providing a notification, from the protection layer, to the RAID protection; wherein the notification is enabled to detail which portions of the first protection domain are physically corrupted.

\* \* \* \* \*